Nov. 4, 1930.  P. LANDROCK  1,780,489
PHOTOGRAPHIC APPARATUS
Filed Nov. 6, 1928   3 Sheets-Sheet 1

INVENTOR
Paul Landrock
BY
Cumpston + Griffith
his ATTORNEYS

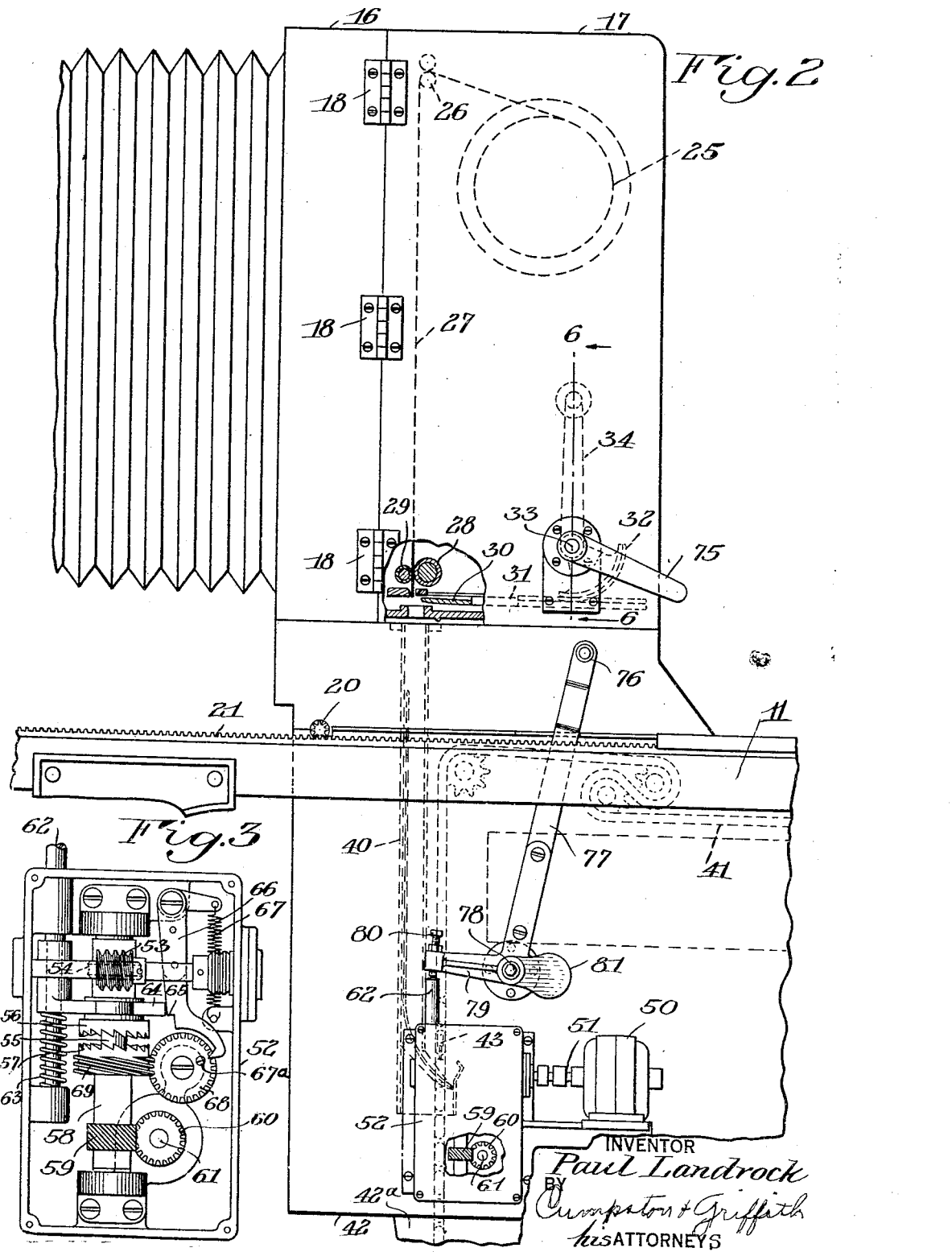

Nov. 4, 1930.  P. LANDROCK  1,780,489
PHOTOGRAPHIC APPARATUS
Filed Nov. 6, 1928  3 Sheets-Sheet 3
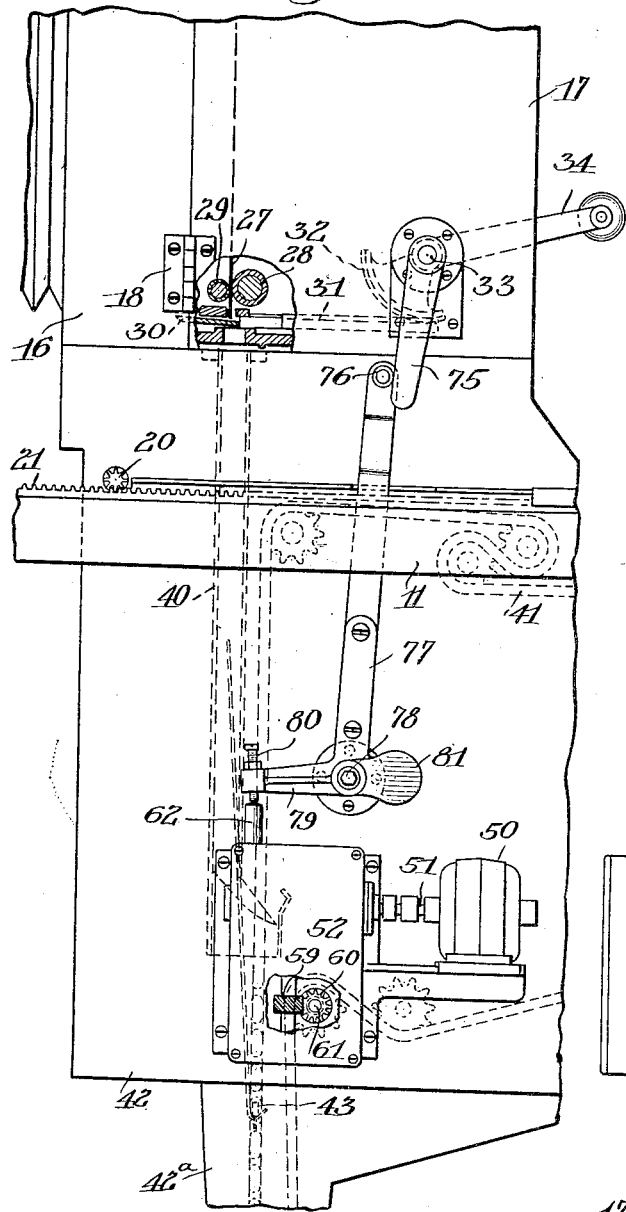
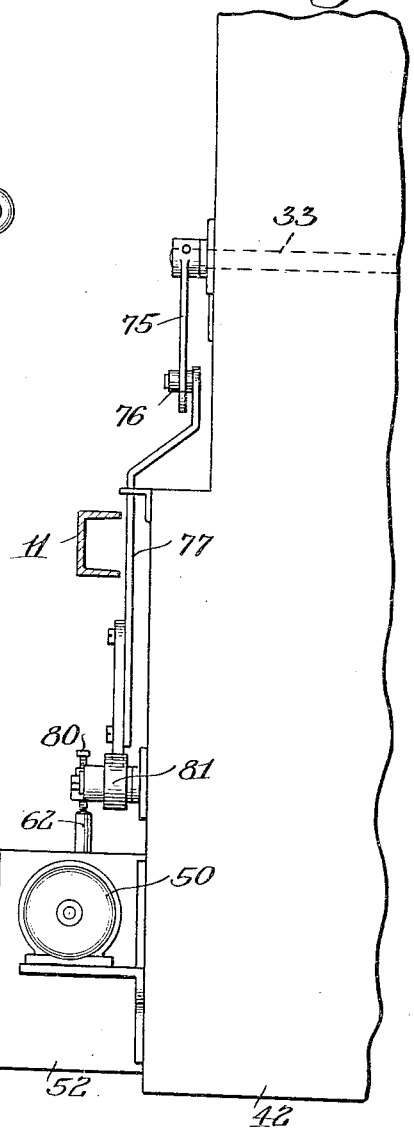
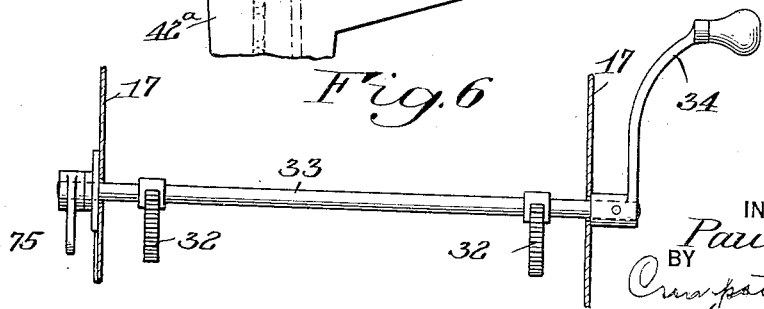
INVENTOR
Paul Landrock
BY
Crumpton + Griffith
his ATTORNEYS Patented Nov. 4, 1930

1,780,489

UNITED STATES PATENT OFFICE

PAUL LANDROCK, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC APPARATUS

Application filed November 6, 1928. Serial No. 317,611.

This invention relates to photographic apparatus, and particularly to that type of apparatus which comprises a camera in combination with means for treating the photographic prints exposed in the camera. Usually the prints are formed by making exposures on portions of a comparatively long strip of sensitized sheet material, and by then severing this strip into sections corresponding to one or more of the prints. The principal object of the present invention is to provide simple, efficient and satisfactory mechanism for coordinating the severing of the sensitized material with the operation of the print treating means.

Another object of the invention is to provide mechanism to insure the operation of the print treating means each time that the sheet material is severed to form a print which should be treated by the treating means. Still another object is the provision of mechanism to insure the severing of the sheet material prior to each actuation of the print treating means, so that a long unsevered strip of sheet material can not be drawn accidentally into the treating means.

To these and other ends the invention resides in certain improvements and combinations of parts, all as will be hereinafter more fully described, the novel features being pointed out in the claims at the end of the specification.

In the drawings:

Fig. 2 is a side elevation of a portion of the apparatus, looking at the side opposite to that which is shown in Fig. 1 and showing the parts in normal position;

Fig. 3 is a view showing details of the driving mechanism for the print treating means, the clutch of this mechanism being in open position;

Fig. 4 is a view similar to Fig. 2 showing the sheet severing mechanism actuated to sever the sheet material and to start the driving of the print treating means;

Fig. 5 is a fragmentary rear elevation of the apparatus, and

Fig. 6 is a cross section taken substantially on the line 6—6 of Fig. 2.

Similar reference numerals throughout the several views indicate the same parts.

Figure 1:
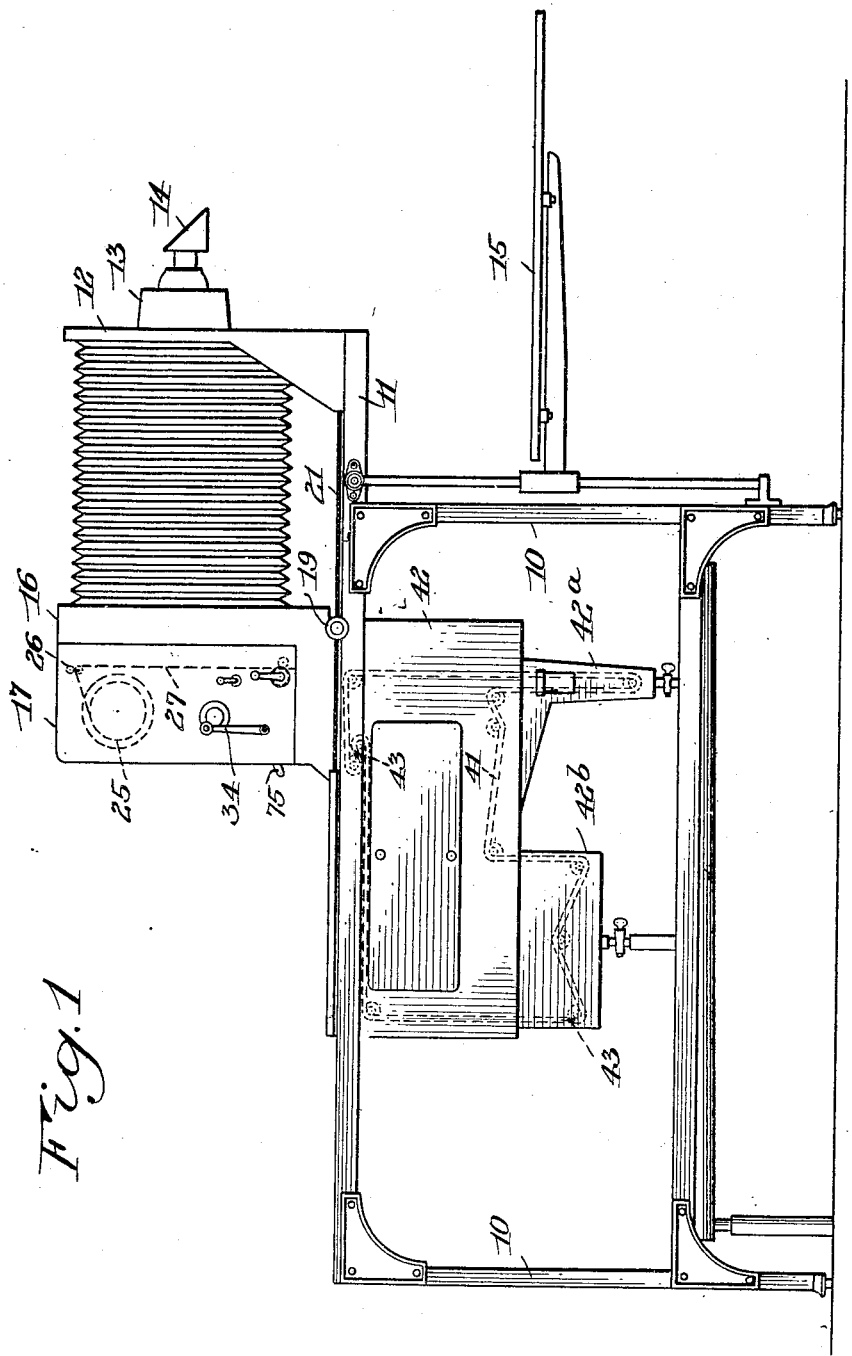
Fig. 1 is a side elevation of one form of photographic apparatus to which the present invention may be applied, illustrating certain features of the invention.

Referring now to Fig. 1, there is shown a frame including the upright members 10 and horizontal rails 11 on the forward end of which is mounted a camera front 12 having a housing 13 which may include suitable lenses and shutter mechanism. A prism 14 is preferably provided to bend the light rays so that the camera may be used to photograph objects placed upon a copyholder 15 which extends forward substantially horizontally from the frame.

A camera body including a portion 16 and a magazine portion 17 hinged thereto by hinges 18 (Fig. 2) is mounted for movement back and forth along the frame members 11 for purposes of focusing the camera, this focusing movement being controlled by means such as the hand wheel 19 (Fig. 1) which turns a shaft journalled in the camera body and provided with a pinion 20 (Fig. 2) meshing with a rack 21 on the frame members 11.

Within the magazine portion 17 there may be placed a supply of film or sensitized sheet material in the form of the roll 25 indicated diagrammatically in Figs. 1 and 2. This sheet material may be led over a roller 26 and stretched as at 27 in the focal plane of the camera lens, being threaded thence between feed rolls 28 and 29. Rotation of these rolls results in feeding the sheet material downwardly past a severing element such as the reciprocating knife blade 30, which may be moved forwardly across the sheet material to sever it at this point. The severing element may be actuated, for instance, by being mounted upon reciprocating rack bars 31, the teeth of which mesh with teeth on gear segments 32 (see also Fig. 6) fixed to a shaft 33 which extends across the magazine portion 17 and is journalled in the side walls thereof. On the right hand side of the apparatus (that is, the side shown in Fig. 1) this shaft is provided with an operating handle 34 which may be moved manually.

The portion of sheet material which is severed by the element 30 drops into suitable receiving means such as the chute 40, from which it may be picked up by suitable conveying mechanisms of known construction, which conveying mechanism may include endless members 41, one on each side of the apparatus within a housing 42, cross bars 43 being provided at intervals along these endless members. These cross bars, as is known in the art, may have forwardly projecting pins arranged to impale the sheet within the chute 40 and to draw each sheet along through print treating means, which may include a developing bath within a tank $42^a$ and a fixing bath within a tank $42^b$. After the prints have been developed and fixed, they may be removed from the conveying mechanism by suitable means of known construction.

The endless members 41 of the print conveying mechanism may be driven, preferably intermittently, by any suitable means, such as the motor 50. The connections between this motor and the conveying mechanism by which the latter is driven intermittently are fully described and illustrated in the copending application of Arthur W. Caps, Serial No. 243,081, filed Dec. 28, 1927, for timing mechanism, and need not be described in detail here. For the purposes of the present application, it is sufficient to state that the motor shaft 51 is extended into a gear box 52 (Fig. 3) and carries a worm 53 which meshes with a worm wheel 54 mounted on a vertical shaft 55. A clutch element 56 is splined to this shaft so that it may move longitudinally thereon but rotates with the shaft. A cooperating clutch element 57 is fixed to a sleeve 58 which carries a spiral gear 59 meshing with another spiral gear 60 on a shaft 61, this latter shaft carrying sprockets meshing with the continuous conveyer members 41 or being connected to drive these conveyer members in any other suitable way.

A plunger 62, normally pressed upwardly by a spring 63, carries a yoke 64 which engages a groove in the upper clutch element 56 so that depression of the plunger 62 carries this clutch element downwardly to engage it with the lower clutch element 57 to establish a driving relation between the motor 50 and the print conveying mechanism. When the yoke 64 is depressed, it is latched in depressed position by a shoulder 65 on a latching lever 66 urged toward latching position by a spring 67. Thus only a momentary depression of the plunger 62 is necessary to initiate the driving action, and the clutch will remain closed until the latching lever 66 is moved to unlatching position by being engaged by a pin $67^a$ on a worm wheel 68 driven by a worm 69 formed on the lower clutch element 57. The worm 69 and worm wheel 68 are so proportioned that the latter rotates one complete revolution during the travel of the print conveying mechanism through the desired distance. Thus, when the plunger has been depressed, the conveying mechanism will be driven to the desired extent and will then be automatically stopped when the pin $67^a$ engages the latching lever 66 and moves it aside so that the spring 63 may elevate the yoke 64 and plunger 62 to disconnect the clutch.

Heretofore it has been usual to provide a handle or other suitable manual means for operating the plunger 62 to drive the print conveying mechanism through one of its cycles. In using photographic apparatus so constructed, it has been necessary for the operator to actuate the severing element 30 and then to actuate the handle controlling the clutch plunger 62. Omission of either one of these operations would result in imperfect functioning of the apparatus. For instance, if actuation of the clutch plunger were inadvertently omitted after each actuation of the severing element, two or more severed sheets might be dropped into the chute 40 before the operator remembered to actuate the clutch to drive the conveying mechanism. On the other hand, if the clutch plunger 62 were depressed without the severing element having been previously actuated, it might some times happen that the bottom of the unsevered sheet material hanging in the chute 40 was picked up by the conveying means and drawn along through the print treating baths, pulling after it a long strip of material from the roll 25 and thus wasting the sheet material.

To overcome this possibility of incorrect operation, and to provide an apparatus which may be operated satisfactorily by a comparatively inexperienced person, the present invention provides a connection between the actuating means for the sheet severing element 30, and the clutch plunger 62, so that each operation of the former results in actuation of the latter, and so that the latter is never normally actuated except when the former is operated.

This connection may comprise any suitable means such as the arms 75 secured to the left end of the shaft 33 as shown in Figs. 2, 4, 5 and 6. When the handle 34 is moved to operate the severing element 30, the arm 75 moves from the position shown in Fig. 2 to that illustrated in Fig. 4, and during such movement it contacts with and shifts a roller 76 on the upper end of the long arm 77 of a bell crank lever pivoted at 78 to the casing 42. This bell crank lever has a short arm 79 provided with an adjusting screw 80 arranged to bear on the top of the clutch plunger 62. A counterweight 81 on the bell crank lever returns it from the position shown in Fig. 4 to that illustrated in Fig. 3 whenever the arm 75 is withdrawn from contact with the bell crank lever.

It will be noted that the operating handle 34 which actuates the sheet severing mechanism is on the right hand side of the camera adjacent the position in which the operator normally stands while he is operating the apparatus. The motor 50, clutch box 52, and clutch plunger 62, on the other hand, are on the left hand side of the apparatus and thus are out of reach of or normally inaccessible to the operator when he is in his normal position. For this reason, it is impossible for him to forget himself and actuate the clutch plunger without previously having actuated the severing mechanism. The only way in which the operator can normally close the clutch is by operating the severing handle 34, which automatically closes the clutch through the connection previously described.

This construction insures the actuation of the sheet conveying mechanism once for each severing operation, and also insures that the conveying mechanism will not be operated more than once for each severing operation.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. In a photographic apparatus, the combination with a camera body arranged to contain a strip of sensitized sheet material, of exposing mechanism, devices for feeding said strip to bring successive portions thereof into the focal plane for exposure and to remove the exposed portions from the focal plane, sheet severing means operable at will independently of said exposing mechanism arranged to sever the exposed portions of said strip, conveying mechanism for moving the severed portions of said sheet material, a driving motor, clutch means connecting said driving motor to said conveying mechanism, and instrumentalities under the control of said severing means for controlling said clutch means.

2. In a photographic apparatus, the combination with exposing mechanism, of sheet feeding devices, sheet severing means, sheet conveying mechanism, driving means for said sheet conveying mechanism, an operating member for said sheet severing means operable independently of said exposing mechanism, and an operative connection between said operating member and said driving means to cause actuation of said conveying mechanism upon operation of said severing means.

3. In a photographic apparatus, the combination with sheet feeding devices, of sheet severing means, sheet conveying mechanism, a source of power, clutch means for connecting said source of power to said conveying mechanism to drive the latter from the former, operating mechanism for said sheet severing means, and means effective upon actuation of said operating mechanism to close said clutch means to drive said conveying mechanism.

4. In a photographic apparatus, the combination with sheet severing means, of sheet conveying mechanism, a source of power, driving mechanism for driving said conveying mechanism intermittently from said source of power, said driving mechanism including a clutch and means for automatically disengaging said clutch after a predetermined interval, operating devices for said sheet severing means, and means effective upon actuation of said operating devices to close said clutch means to set said intermittent driving mechanism into operation.

5. In a photographic apparatus, the combination with sheet severing means, of operating devices for said sheet severing means, said operating devices including a movable member, sheet conveying mechanism for moving a sheet severed by said severing means, a source of power, driving mechanism for driving said conveying mechanism intermittently from said source of power, said driving mechanism including a clutch and means for automatically disengaging said clutch after a predetermined interval, and clutch closing mechanism including a member in the path of movement of the movable member of said operating devices, so that actuation of said operating devices is effective to close said clutch to set said intermittent driving mechanism into operation.

6. In a photographic apparatus, the combination with sheet severing means, of sheet conveying mechanism, a source of power, clutch means for connecting said source of power to said conveying mechanism to drive the latter from the former, operating mechanism for said sheet severing means, said operating mechanism being easily accessible from the normal station of the operator of the apparatus, a member for engaging said clutch means, said member being normally inaccessible from said normal station of the operator, and means controlled by movement of said operating mechanism for moving said member to engage said clutch means, to connect the conveying mechanism to the source of power upon actuation of said severing means.

7. In a photographic apparatus, the combination with a casing, of sheet severing means therein, sheet conveying mechanism, a source of power, clutch means for connecting said source of power to said conveying mechanism to drive the latter from the former, operating mechanism for said sheet severing means, said operating mechanism including a handle at one side of said casing accessible from the normal station of the operator of the apparatus and a part moved by said handle adjacent the opposite side of said casing, a member adjacent said opposite side of said casing and inaccessible from said normal station of the operator for operating said clutch means, and instrumentalities operated by said part moved by the handle for moving said clutch operating member, so that operation of said handle to sever a sheet automatically connects said sheet conveying mechanism to said source of power.

PAUL LANDROCK.